Aug. 21, 1956 J. ENSINK ET AL 2,760,073
OSCILLATOR CIRCUIT-ARRANGEMENT
Filed March 15, 1952
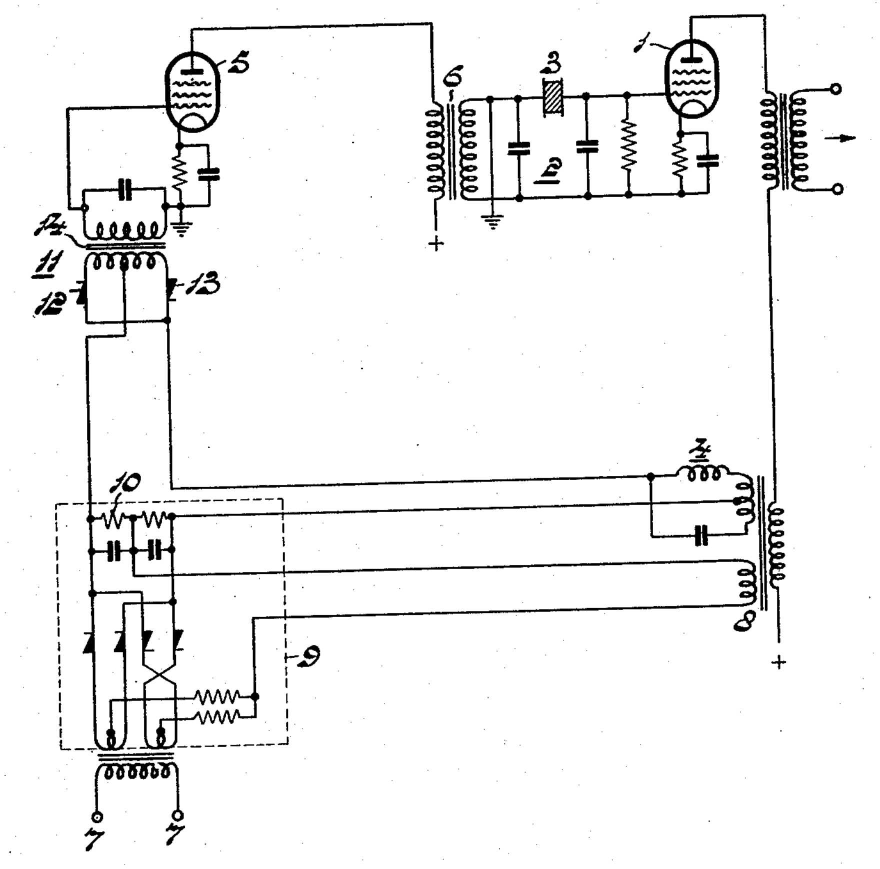
INVENTORS
Willem Hermes
Johannes Ensink
By Fred M Vogel
Agent United States Patent Office 2,760,073
Patented Aug. 21, 1956

2,760,073

OSCILLATOR CIRCUIT-ARRANGEMENT

Johannes Ensink and Willem Hermes, Hilversum, Netherlands, assignors to Hartford National Bank and Trust Company, Hartford, Conn., as trustee Application March 15, 1952, Serial No. 276,816

Claims priority, application Netherlands April 9, 1951

1 Claim. (Cl. 250—36)

This invention relates to electronic oscillator circuit-arrangements and more particularly to synchronized crystal oscillators.

The main object of the invention is to prevent overloading of a crystal oscillator when supplying a synchronizing oscillation thereto.

With the use of a synchronized crystal oscillator it has been proposed to re-adjust automatically the amplitude of the synchronization alternating voltage in accordance with the difference between the natural frequency of the crystal and the synchronization frequency, in order to prevent overloading of the crystal. To this end the crystal oscillator oscillation and the synchronization oscillation are supplied to a phase-comparison stage producing a control voltage which is determined by the phase difference therebetween, and by means of which the amplitude of the synchronization oscillations fed to the crystal oscillator is controlled.

This circuit-arrangement has a limitation in that, if the crystal oscillator frequency is approximately equal to the synchronization frequency, the phase difference of the two oscillations is substantially zero, while the amplitude of the synchronization oscillations becomes very small, so that, the phase of the oscillator oscillation is not stabilized but is readily affected by extraneous factors, for example, temperature variations.

Thus a further purpose of the present invention is to provide a circuit-arrangement in which the phase of the generated oscillator oscillation also tends to balance out.

To this end the circuit-arrangement according to the invention is based on an oscillator circuit of known type comprising an amplifier having two feed-back paths, the first of which causes self-oscillation of the amplifier and the second of which produces a current in an impedance common to the two feed-back paths, which current is practically displaced by 90° relative to the current produced in said impedance by the first feed-back path.

According to the invention, this circuit-arrangement comprises a phase comparison stage producing a control voltage which is determined by the phase difference between the oscillator oscillation and the synchronization oscillation, the second feed-back path including a balanced amplitude modulator to which the control voltage and the oscillator voltage are supplied.

In order that the invention may be readily carried into effect, it will now be described in detail with reference to the accompanying drawing, wherein the single figure illustrates schematically a preferred embodiment of the invention.

In the figure, numeral 1 denotes an amplifying tube with a "Colpitts" feed-back coupling 2 between grid and cathode circuit, which feed-back coupling includes a crystal 3. By this feed-back the amplifier is caused to self-oscillate so that the frequency produced substantially coincides with the resonance frequency of crystal 3. Besides the first feed-back path 2, 3 a second feed-back path is provided which comprises a 90° phase displacing network 4, coupled to the anode circuit of tube 1, and a second amplifying tube 5 whose anode circuit is coupled by way of a transformer 6 to the grid circuit of tube 1.

In order to establish synchronization of the oscillations produced by oscillator 1 and a synchronization oscillation supplied to terminals 7, both the synchronization oscillation and the oscillator oscillation produced across the secondary of an anode transformer 8 of tube 1 are supplied to a phase comparison stage 9 constituting a ring modulator, so that across the output filter 10 of the phase comparison stage 9 a voltage is set up in response to the phase difference between the oscillator oscillation of tube 1 and the synchronization oscillation at the terminals 7. This control voltage, together with the oscillator oscillation displaced in phase by 90° in the network 4, are supplied to a balanced amplitude modulator 11 comprising rectifiers 12, 13 and a transformer 14 having a center tapping on the primary and a secondary coupled to the grid-circuit of tube 5.

The circuit-arrangement operates as follows:

If the crystal frequency and the synchronization frequency are practically equal no phase difference is found to occur between the oscillator frequency and the synchronization frequency. In this case the voltage across filter 10 will be zero, so that the amplitude of the oscillator oscillation generated in the secondary of transformer 14 is also zero.

As soon, however, as the crystal frequency departs from the synchronization frequency, a corresponding phase-difference will also occur between the oscillations supplied to the phase comparison stage 9, thus producing a control voltage across filter 10. This control voltage renders one rectifier, for example, rectifier 12 of modulator 11, conductive for a longer part of the period of the oscillator alternating voltage than the other rectifier 13 so that an oscillation, whose amplitude increases with an increase in phase difference between the oscillator oscillation and the synchronization oscillation, and which is displaced in phase by 90° relatively to the oscillator oscillation by means of the phase displacing network 4, is supplied by way of tube 5 to the grid transformer 6 of tube 1.

Due to this phase-difference of 90° between the oscillator oscillation supplied to the crystal 3 by way of the first feed-back path 2, 3 and by way of the second feed-back path 4, 5, 6, the amplitude of the total current through crystal 3 will remain practically constant so that there is no risk for overloading the crystal.

In order to avoid phase modulation of the oscillator 1, due to an excessive difference between the crystal frequency and the synchronization frequency, a control voltage commensurate with said frequency difference may, for example, be produced, by which control voltage the coupling, for example, between the tube 5 and the transformer 6 is removed.

The circuit-arrangement may also be employed with advantage for synchronizing an oscillator not having a crystal. In this event it has the advantage that the amplitude of the oscillator oscillation remains substantially constant with an increase in frequency difference between the oscillator frequency and the synchronization frequency. It is to be understood that the invention is not limited to the details disclosed but includes all such variations and modifications as fall within the spirit of the invention and the scope of the appended claim.

What we claim is:

A synchronized oscillation generator comprising an amplifier having an input circuit and an output circuit, a feed-back path including a crystal element coupled to said input circuit thereby to produce sustained oscillations in said amplifier, means for deriving from said output circuit a first wave having a frequency equal to the frequency of said sustained oscillations and a second wave displaced 90 degrees in phase relative to said first wave, input means for a synchronization signal, phase comparing means, means for applying said first wave and said synchronization signal to said phase comparing means, said phase comparing means producing a control voltage having an amplitude dependent upon the phase difference between said first wave and said synchronization signal, balanced amplitude modulator means, means for applying said second wave and said control voltage to said balanced modulator means, and means for applying the output of said balanced modulator means to the said input circuit.

References Cited in the file of this patent

UNITED STATES PATENTS

| | | |
|---|---|---|
| 2,066,528 | Harper | Jan. 5, 1937 |
| 2,552,157 | Delvaux | May 8, 1951 |
| 2,588,094 | Eaton | Mar. 4, 1952 |
| 2,676,259 | Hansen | Apr. 20, 1954 |